(12) United States Patent
Shi et al.

(10) Patent No.: US 10,003,269 B2
(45) Date of Patent: Jun. 19, 2018

(54) SMART GROUPING CONTROL METHOD FOR POWER CONVERTER SWITCHING NOISE MANAGEMENT

(71) Applicant: DIALOG SEMICONDUCTOR INC., Campbell, CA (US)

(72) Inventors: Fuqiang Shi, Campbell, CA (US); Kai-Wen Chin, Campbell, CA (US); Cong Zheng, Campbell, CA (US); Jianming Yao, Campbell, CA (US); Yong Li, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days. days.

(21) Appl. No.: 15/414,597

(22) Filed: Jan. 24, 2017

(65) Prior Publication Data

US 2017/0214329 A1    Jul. 27, 2017

Related U.S. Application Data

(60) Provisional application No. 62/287,377, filed on Jan. 26, 2016.

(51) Int. Cl.
*H02M 1/08* (2006.01)
*H02M 3/335* (2006.01)
*H02M 1/44* (2007.01)
*H02M 1/00* (2006.01)

(52) U.S. Cl.
CPC ......... *H02M 3/33515* (2013.01); *H02M 1/08* (2013.01); *H02M 1/44* (2013.01); *H02M 3/33507* (2013.01); *H02M 2001/0009* (2013.01)

(58) Field of Classification Search
CPC ...... H02M 3/33515; H02M 1/08; H02M 1/44; H02M 2001/0009; H02M 1/12; H02M 3/335; H02M 3/33507; H02M 3/33523
See application file for complete search history.

(56) References Cited

U.S. PATENT DOCUMENTS

| | | | |
|---|---|---|---|
| 2008/0084723 A1* | 4/2008 | Balakrishnan | H02M 3/335 363/97 |
| 2010/0164455 A1* | 7/2010 | Li | H02M 3/157 323/283 |
| 2013/0077350 A1* | 3/2013 | Mao | H02M 3/33523 363/16 |
| 2014/0022829 A1* | 1/2014 | Shi | H02M 1/4258 363/84 |
| 2014/0092647 A1* | 4/2014 | Ren | H02M 3/33553 363/21.17 |
| 2015/0287386 A1* | 10/2015 | Kim | G09G 5/10 345/690 |

* cited by examiner

*Primary Examiner* — Gustavo Rosario Benitez
(74) *Attorney, Agent, or Firm* — Haynes and Boone, LLP

(57) ABSTRACT

A switching power converter is provided that cycles a power switch during a group pulse mode of operation to produce a train of pulses within a group period responsive to a control voltage being within a group mode control voltage range. Depending upon the control voltage, the number of pulses in each train of pulses is varied to provide a linear power delivery to the load.

17 Claims, 7 Drawing Sheets

Fly-back AC/DC controller

US 10,003,269 B2

SMART GROUPING CONTROL METHOD FOR POWER CONVERTER SWITCHING NOISE MANAGEMENT

CROSS-REFERENCE TO RELATED APPLICATIONS

This application claims the benefit of U.S. Provisional Application No. 62/287,377, filed Jan. 26, 2016.

TECHNICAL FIELD

This invention is in the field of power converters, and more particularly to circuits and techniques for altering noise emitted by switching power converters by using a group pulse control method.

BACKGROUND

A flyback switching power converter is typically provided with a mobile device as its transformer provides safe isolation from AC current. Like all switching power converters, a flyback includes a power switch transistor that is controlled by a controller to regulate the power delivery to the load. The cycling of the power switch creates switching noise that can affect the mobile device. A mobile device often includes a touchscreen that is becoming more and more sensitive to switching noise. For example, users can now operate touchscreens on many phones and tablets even when wearing gloves. The downside to such high sensitivity touchscreens, and other electrical components, is that the operation of these components can be susceptible to interference from the switching noise. For example, sensing where a touchscreen has been touched involves a touchscreen sensor monitoring certain frequency bands as described in detail below. If the electromagnetic interference (EMI) produced by a switching power converter is within the frequency band monitored by the touchscreen sensor, then performance of the touchscreen may be undesirably altered. It will be appreciated that the performance of other electrical components may also be undesirably altered by the EMI produced by switching power converters.

The interference from switching noise from a switching power converter such as a flyback is exacerbated because of the various switching modes used to increase efficiency. In particular, it is conventional to cycle the power switch using pulse width modulation (PWM) during periods of relatively heavy load. The duty cycle (pulse width) is reduced as the load is reduced during PWM operation. But as the load continues to reduce, it is more efficient to cycle the power switch using pulse frequency modulation (PFM). The various switching frequencies used during PFM operation (e.g., from 22 KHz to 89 KHz) spreads the switching noise across a relatively wide frequency band such that finding a suitably noise-free band for touchscreen operation may be problematic.

Accordingly, there exists a need to control the frequency bands of EMI produced by switching power converters.

SUMMARY

During pulse width modulation (PWM) operation at a relatively-heavy load, the switching frequency is maintained constant such that the switching noise is concentrated at the switching frequency and its harmonics. It is thus relatively straightforward during PMW operation to find a suitably noise-free band for touchscreen operation (or operation of other noise-sensitive processes). But it is not efficient to extend PWM operation across the full load range (from very light load to very heavy load) in a switching power converter. It is thus conventional to transition to pulse frequency modulation (PFM) operation as the load is reduced. But such transition to PFM operation then tends to spread the switching noise across various frequency bands due to the changing switching frequencies.

To provide switching noise management, a group pulse mode (GPM) is introduced in which the switching power converter may transition from PWM operation (or PFM operation across a limited band) during relatively heavy load operation to the group pulse mode. To control the transition to group pulse mode, the controller for controlling the cycling of the power switch transistor is modified to compare the control voltage to a threshold value. In that regard, it is well known in the power conversion arts for the controller to respond to a control voltage that is generated from a comparison of a feedback voltage to a reference voltage. The feedback voltage is obtained from the output voltage. For example, in a flyback converter, the feedback voltage may be sensed from the auxiliary winding at the transformer reset time. Alternatively, the feedback voltage may be sensed through an optoisolator or some other isolating means between the primary and secondary sides of the flyback transformer.

The controller compares the feedback voltage to the reference voltage to generate an error signal that may then be compensated such as through a loop filter to form the control voltage. The controller is configured to compare the control voltage to a threshold value to control the transition to group pulse mode control. If the control voltage is greater than the threshold value, the controller continues to operate in PWM (or PFM) mode in a conventional fashion. But if the control voltage is less than the threshold value, the controller transitions to the group pulse mode. As suggested by the name, group pulse mode is effected when the power switch transistor is cycled to produce a train or group of pulses (each pulse corresponding to an on-time period for the power switch transistor in each cycle). Depending upon the control voltage, the size of the group for each burst of pulses is changed. For example, the size of the pulse train may be varied from, for example, fifteen pulses down to one pulse depending upon the value of the control voltage. Should the control voltage drop below a low threshold voltage, the controller transitions from group pulse mode to another mode of control such as PFM. Since such a transition to PFM doesn't occur until a relatively light load occurs (corresponding to the control voltage equaling the relatively-small low threshold voltage), the resulting PFM operation is denoted herein as a "deep" PFM (DPFM) operation. The control voltage range for group pulse mode control thus ranges from a high threshold voltage to the low threshold voltage.

The control voltage range between the high and low threshold voltages may be quantized into a number of group modes, such as 15 group modes. The lowest group mode corresponds to the lowest number of pulses within the pulse train (e.g., 1) and starts at the low threshold voltage. As the control voltage increases, the number of pulses within the successive group mode increases successively. For example, the number of pulses in the pulse train may increase by one with each increase in the group mode. But the power control by changing the number of pulses from one group mode to another is relatively coarse. The controller is thus configured to also change the group period (the period for one pulse train) as a function of the control voltage. In this fashion, a linear power output is obtained as a function of the control voltage across the various group modes.

The resulting group pulse mode control is quite advantageous as the control voltage range may correspond to what would have been a switching frequency range of from (for example) approximately 5 KHz to 86 KHz if conventional PFM operation was employed instead. Such conventional PFM operation is efficient but spreads the switching noise undesirably. In contrast, the switching noise for group pulse mode control is concentrated at the switching frequency for PWM operation (e.g., 86 KHz) and its harmonics. The switching power converter thus enjoys the efficiency of conventional PFM operation over a moderate load range yet has a noise spectrum more like PWM operation. In this fashion, noise-sensitive applications such as touchscreen controllers may readily find suitably noise-free bands during group pulse mode operation.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
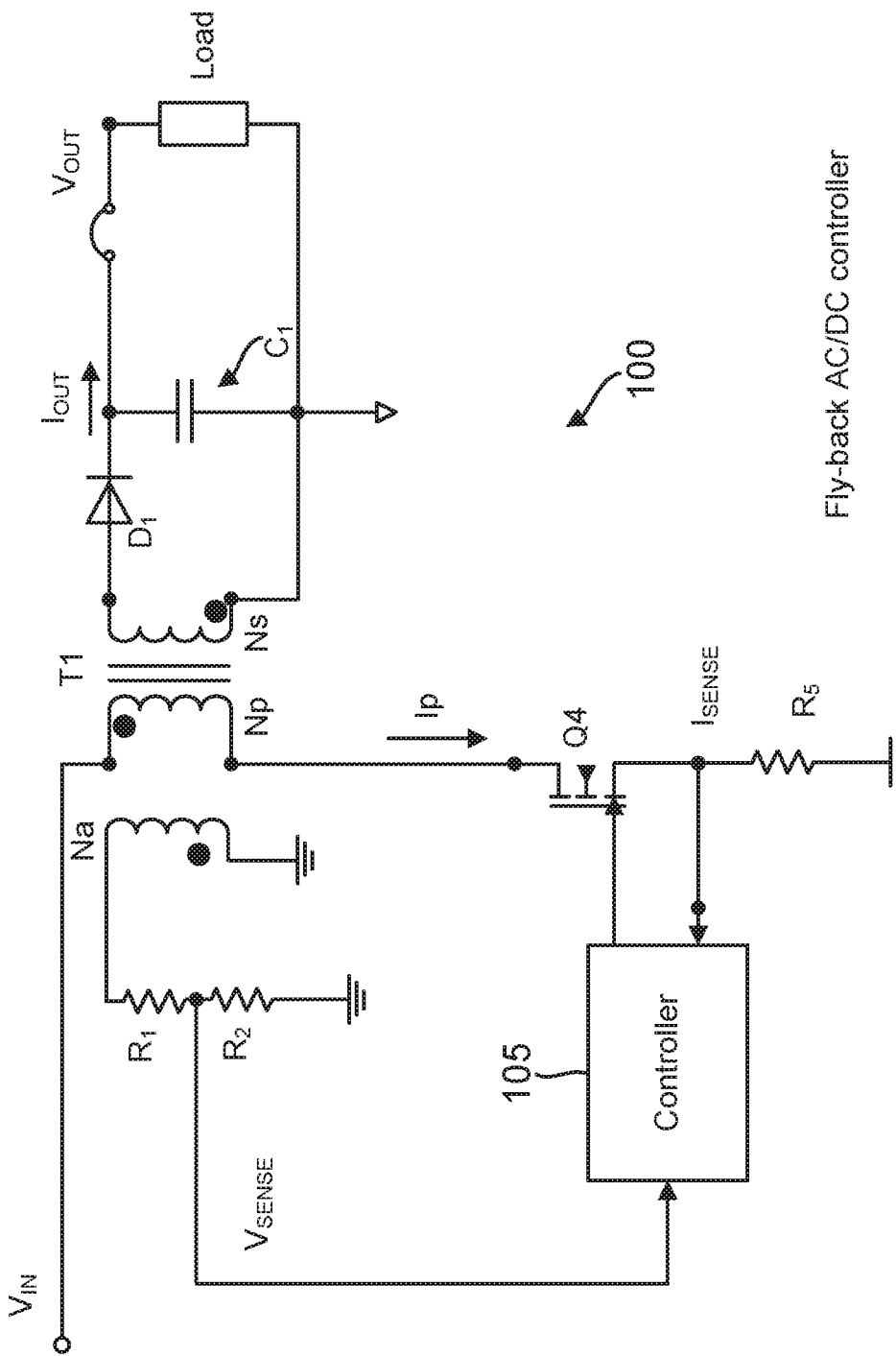
FIG. 1 is a block diagram of a flyback converter including a controller configured for group pulse mode control in accordance with an aspect of the disclosure.

Turning now to the drawings, FIG. 1 shows a fly-back converter 100 including a controller 105 configured for group pulse mode (GPM) control. Controller 105 controls the cycling of a power switch transistor (Q4) such as its turn on time, turn off time, and switching frequency to control an output voltage $V_{OUT}$ delivered to a load. A rectified input voltage (Vin) from an AC mains drives a magnetizing current through a primary winding of a transformer T1 when controller 105 cycles power switch transistor Q4 on. Controller 105 may then cycle off power switch transistor Q4 when the current conducted through power switch transistor Q4 reaches a desired peak current. To determine when the desired peak current has been reached, controller 105 monitors a voltage $I_{SENSE}$ obtained across a sense resistor $R_S$ coupled between a source of power switch transistor Q4 (in an NMOS embodiment for Q4) and ground. When $I_{SENSE}$ reaches the desired peak value, controller 105 opens power switch transistor Q4.

Controller 105 includes a feedback loop discussed further below that determines the desired peak current responsive to a feedback voltage sensed from the output voltage $V_{OUT}$. For example, controller 105 may monitor a feedback voltage $V_{SENSE}$ obtained through a voltage divider formed by a resistor R1 and R2 coupled in series to an auxiliary winding for transformer T1. When power switch transistor Q4 is cycled off, the magnetic energy stored within transformer T1 through the build-up of the magnetizing current is released through a pulsing high of a secondary current through a secondary winding for transformer T1. The secondary current is rectified by a diode $D_1$ and charges an output capacitor $C_1$ with the output voltage $V_{OUT}$. The secondary current then ramps down to zero at a time denoted as the transformer reset time. By sampling the feedback voltage $V_{SENSE}$ at the transformer reset time, controller 105 obtains a feedback voltage that is proportional to the output voltage. As discussed further herein, controller 105 generates an error voltage through a comparison of the feedback voltage $V_{SENSE}$ to a reference voltage. In addition, controller 105 generates a control voltage through a filtering of the error voltage. Controller 105 is configured to determine whether the control voltage lies within a control voltage range extending from a low threshold voltage to a high threshold voltage to determine whether to cycle the power switch transistor Q4 according to the group pulse mode.

The control voltage range between the high and low threshold voltages may be quantized by a number of control voltage range steps, each voltage range step corresponding to a group mode. For example, in an embodiment in which the control voltage range is divided into 15 equal-sized control voltage range steps, there would be 15 corresponding group modes, one for each control voltage range step (vc_step). A lowest group mode corresponds to the lowest number of pulses within the pulse train (e.g., 1) and starts at the low threshold voltage and extends across the first voltage range step. As the control voltage increases, the number of pulses within the successive group mode increases successively. For example, the number of pulses in the pulse train may increase by one with each increase in the group mode. But the power control by changing the number of pulses from one group mode to another is relatively coarse. Controller 105 is thus configured to also change the group period (the period for one pulse train) as a function of the control voltage as explained further herein. In this fashion, a linear power output is obtained as a function of the control voltage across the various group modes.

The resulting group pulse mode control is quite advantageous as the control voltage range may correspond to what would have been a switching frequency range of from (for example) approximately 5 KHz to 86 KHz if conventional PFM were employed instead. Such conventional PFM operation is efficient but spreads the switching noise undesirably. In contrast, the switching noise for group pulse mode control is concentrated at the switching frequency for PWM operation (e.g., 86 KHz) and its harmonics. The switching power converter thus enjoys the efficiency of conventional PFM operation over a moderate load range yet has a noise spectrum more like PWM operation. In this fashion, noise-sensitive applications such as touchscreen controllers may readily find suitably noise-free bands during group mode control operation.

Some theory for the group mode pulse control will now be discussed. The mathematics is simplified if the low threshold voltage Vth is replaced by a modified low threshold voltage Vth' that equals (Vth−vc_step). The number of pulses within each pulse train for a given group mode can be expressed as an integer function of a ratio of voltage range from the modified low voltage threshold to the voltage range step. In particular, the real value of this ratio is as follows:

$$N\_group\_real(Vc) = (Vc - Vth')/vc\_step$$

where N_group_real (Vc) is the real value of the ratio, Vc is the control voltage, Vth' is the modified low threshold voltage, and vc_step is the voltage range step. Given this real function, the integer number of the pulses within the pulse train for a given group mode is:

$$N_{group(Vc)} = \text{floor} \times (N_{group_{real}(Vc)}) + 1$$

where N_group(Vc) is the integer number of pulses for the pulse train in the group mode corresponding to the voltage range step containing the current value of the control voltage (Vc) and floor(X) is a function that takes the nearest integer value of its argument.

Figure 2:
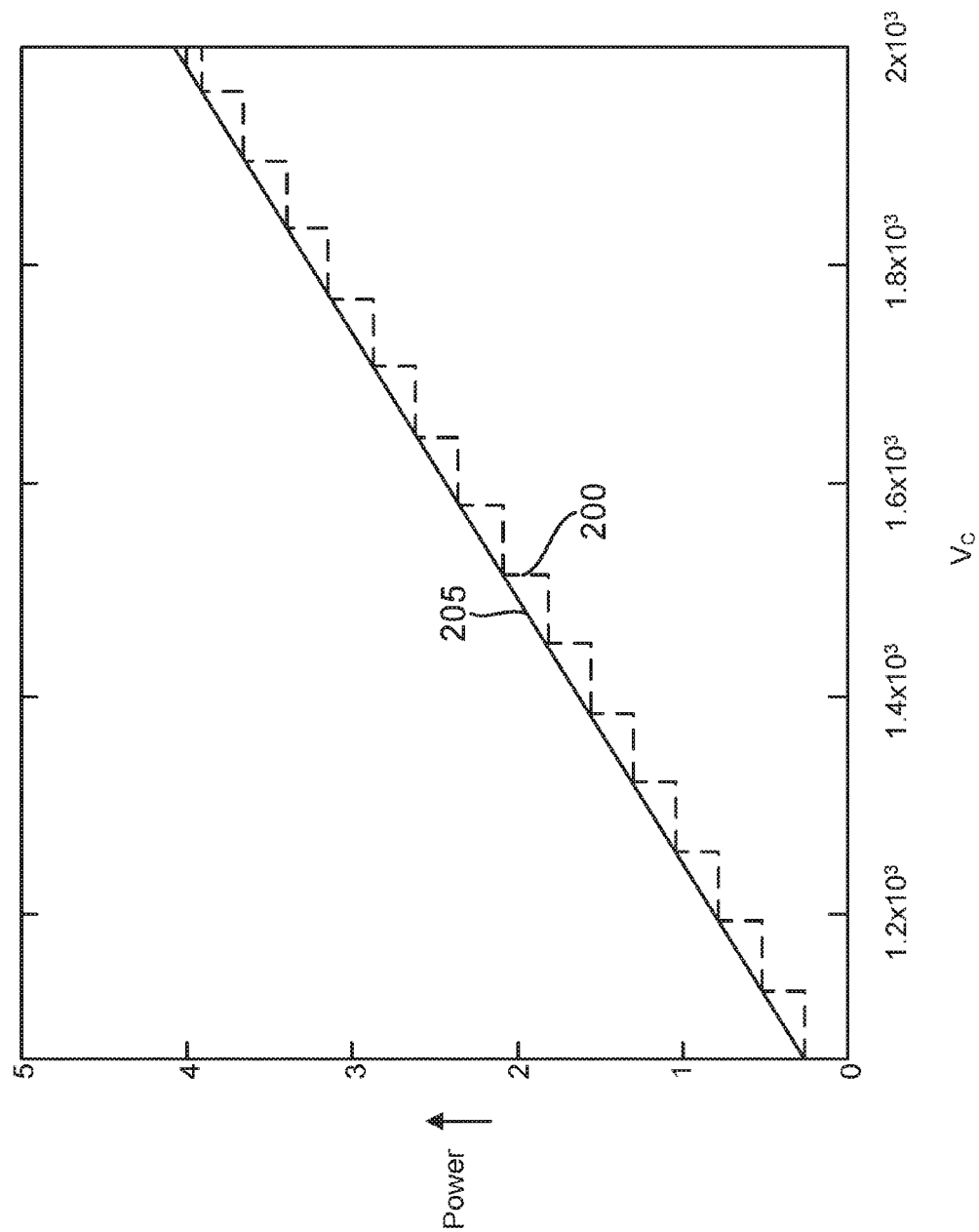
FIG. 2 illustrates the output power for the flyback converter of FIG. 1 as a function of the control voltage while the controller is configured for the group pulse mode control and also while the controller is configured for a modified group pulse mode control in which the group period is held constant for each group mode.

With the burst group period for each pulse train defined as "Tp_group" the resulting output power for flyback converter 100 as a function of the control voltage Vc becomes:

$$P\_int(Vc) = \frac{1}{2} \times Lm \times Ip^2 \times \left(\frac{N\_group(Vc)}{Tp\_group}\right) \times \eta$$

where Lm is the magnetizing inductance of the primary winding, Ip is the peak primary current value, and η is the power conversion efficiency. If the burst group period Tp_group was constant across all the group modes, the output power of flyback converter 100 as a function of the control voltage would be as shown for curve 200 in FIG. 2. The quantization of output power by increasing the number of pulses by one from one group mode results in an undesirably stepping of the output power. To make the output power a linear function of the control voltage, the group period may be varied as a function of the control voltage as follows:

$$Tp\_group(Vc) = Tp\_group0 \times (N\_group(Vc)/N\_group\_real(Vc))$$

where Tp_group(Vc) is the group period as a function of the control voltage, and Tp_group0 is a constant group period value. The group period at the lowest value of the control voltage for a given group mode over a corresponding voltage range step will thus begin at Tp_group0 and then decrease as the control voltage increases. It can then be shown that the output power as a function of the control voltage (P(Vc)) is:

$$P(Vc) = \frac{1}{2} \times Lm \times Ip^2 \times \left(\frac{N\_group(Vc)}{Tp\_group(Vc)}\right) \times \eta$$

where P(Vc) is represented by line 205 in FIG. 2 and is a smooth linear function of the control voltage. The group period is thus varied to account for the discontinuous steps in the original power function 200.

Figure 3:
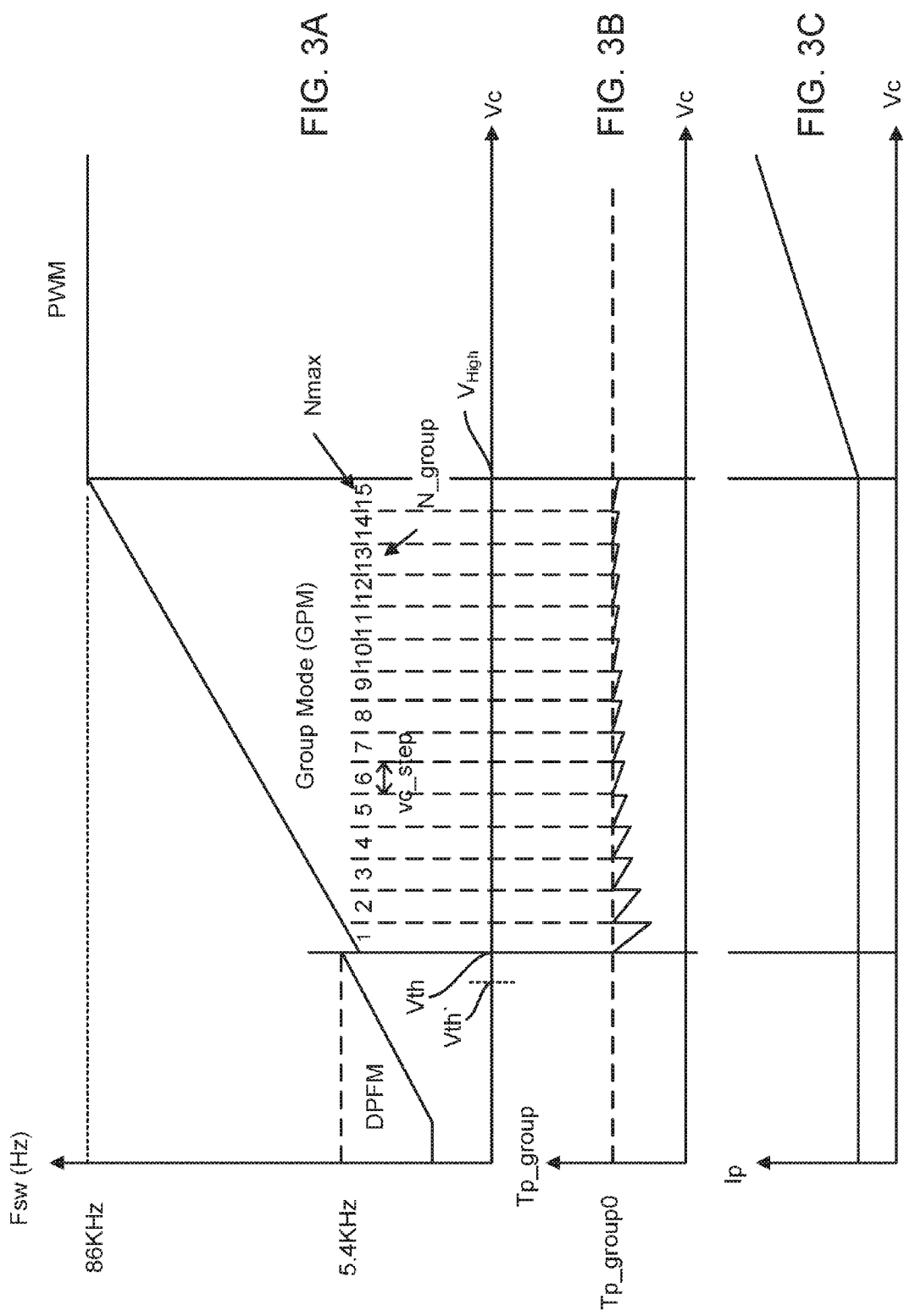
FIG. 3A illustrates the PWM mode, the group modes, and the DPFM mode for the controller of FIG. 1 as a function of the control voltage in accordance with an aspect of the disclosure.
FIG. 3B illustrates the group period for the group modes of FIG. 3A.
FIG. 3C illustrates the peak current for the operating modes of FIG. 3A.

An example division of the control voltage range is shown in FIG. 3A. Controller 105 is configured to operate in PWM mode when the control voltage Vc is higher than the high threshold voltage (Vhigh). During PWM operation, the switching frequency is relatively high such as 86 KHz. The switching noise during PWM operation will thus be concentrated at 86 KHz and its harmonics. This same switching frequency is used for the pulse trains in the group modes when the control voltage is in the group mode control voltage range ranging from the low threshold voltage (Vth) to the high threshold voltage Vhigh. In the embodiment shown in FIG. 3A, the control voltage step for each group mode is such that the group mode control range is divided into fifteen control voltage steps. A first control voltage step starting at the low threshold voltage Vth corresponds to a group mode 1. The group modes range from group mode 1 to a group mode 15. Each successive group mode has one more pulse in its pulse train as compared to the preceding group mode. The pulse train for group mode 1 is thus one pulse long. The pulse train for group mode 2 would be two pulses long, the pulse train for group mode 3 would be three pulses long, and so on such that a final group mode 15 has a pulse train that is fifteen pulses long. It will be appreciated that the number of initial pulses in group mode 1 may be greater than one in alternative embodiments.

The switching frequency for the pulses in each pulse train may match the switching frequency used for the PWM operation (e.g., 86 KHz). When the control voltage drops below the low threshold voltage Vth, controller 105 begins a deep PFM (DPFM) mode of operation that may range from a starting pulse frequency such as 5.4 KHz. The pulse frequency for DPFM operation drops toward zero as the control voltage is reduced further from the low threshold voltage Vth. The starting pulse frequency for the transition into the DPFM mode equals a reciprocal of the default group period Tp_group0.

Referring again to GPM operation, the pulse train length or number of pulses within each pulse train (N_group) for each group mode also corresponds to the group mode number. For example, group mode 15 has a pulse train length of fifteen, which is the maximum value (Nmax) for N_group. It may thus be shown that the high threshold voltage Vhigh=low threshold voltage Vth+Nmax*vc_step.

The group period Tp_group as a function of the control voltage for GPM operation is shown in FIG. 3B for the group modes of FIG. 3A. The group period begins at Tp_group0 at the start (lowest value of the control voltage) for each group mode and then decreases. The difference between the starting (default) value Tp_group0 and the final value of the group period (the highest value of the control voltage) for each group mode is greatest for the lowest group mode (group mode 1) and smallest for the highest group mode (group mode 15). The peak current (Ip) for the DPFM operation, group mode operation, and PWM operation of FIG. 3A is shown in FIG. 3C. The peak current for each pulse is a constant value for both the DPFM and group mode operation whereas the peak current increases linearly as a function of the control voltage during PWM operation.

Figure 4:
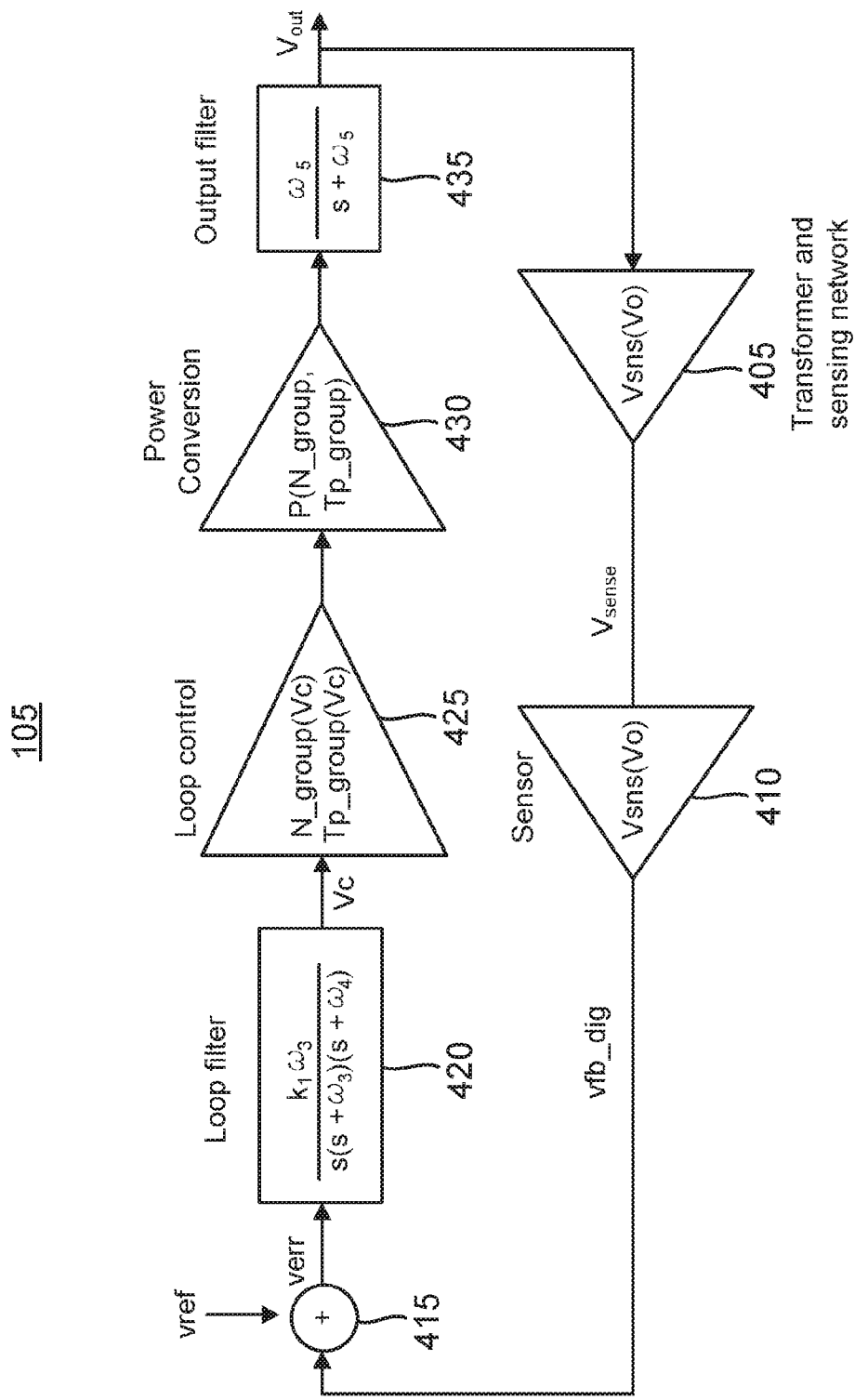
FIG. 4 illustrates the control loop within the controller of FIG. 1 in accordance with an aspect of the disclosure.

The control loop for controller 105 is shown in more detail in FIG. 4. The output voltage $V_{OUT}$ is sampled as discussed with regard to flyback converter 100 through a transformer and sensing network 405 that represents the auxiliary winding of the transformer and the voltage divider of FIG. 1. Controller 105 includes a sensor 410 such as an analog-to-digital converter (ADC) that converts the feedback voltage into a digitized version vfb_dig. A comparator 415 compares the digitized feedback voltage vfb_dig to a digital reference voltage vref to produce a digital error signal Verr. It will be appreciated that comparator 415 may be replaced by an error amplifier in an analog version for controller 105 in alternative embodiments. The error signal Verr is processed through a loop filter 420 to produce the control voltage 420. Regardless of whether the processing of the feedback voltage is digital or analog, the control voltage is an analog voltage as discussed with regard to FIG. 3A. A loop control circuit 425 determines the pulse train number N_group(Vc) and the group period Tp_group(Vc) as discussed above. Controller 105 then cycles the power switch transistor 105 with the pulse train number of pulses within the group period as represented by a power conversion process 430. Depending upon the electrical properties of the transformer T1 and the output stage as represented by output filter 435, the flyback converter produces the output voltage $V_{OUT}$.

Figure 5:
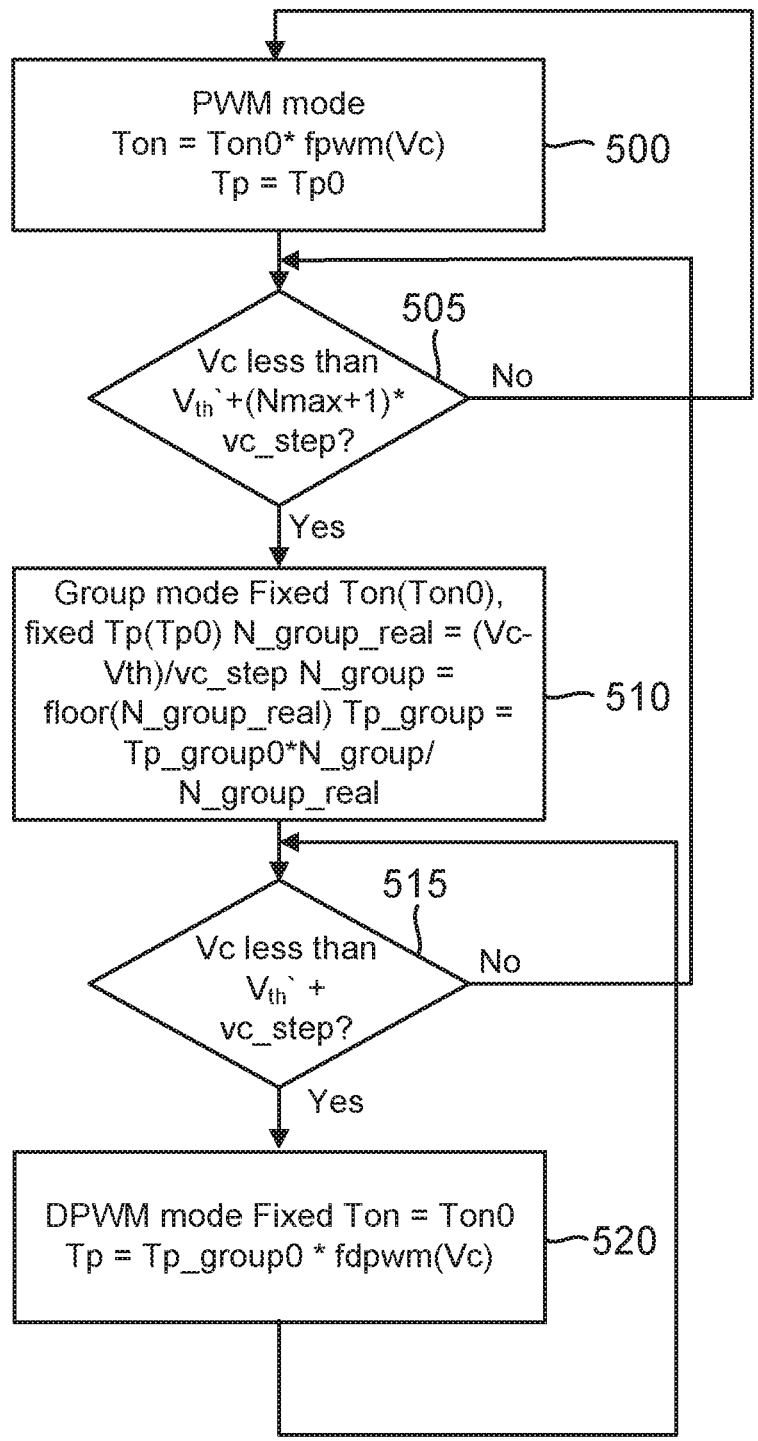
FIG. 5 is a flowchart for an example method of operation for the controller of FIG. 1 in accordance with an aspect of the disclosure.

A flowchart for a method of operation for controller 105 is shown in FIG. 5. The method begins with the control voltage being greater than the high threshold voltage Vhigh, which equals the sum of the low threshold voltage Vth and (Nmax)*vc_step as discussed earlier such that controller operates in the PWM mode during an initial step 500. The on time (Ton) in each cycle of the power switch transistor Q4 is given as a product of a default on time Ton0 with a pulse width control function (fpwm) of the control voltage Vc. Each power switch cycle has a fixed period of Tp0. Controller 105 determines whether the control voltage has dropped below the high threshold voltage Vhigh in a step 505. Note that determining whether the control voltage is less than the high threshold voltage Vhigh is equivalent to determining whether the control voltage is less than a sum of the modified low threshold voltage Vth' with the product of (Nmax+1) and vc_step. If the determination in step 505 is negative, then operation continues in the PWM mode (step 400). If the determination in step 505 is positive, then group mode control begins in an step 510.

During group mode control, the switching frequency for each cycle of the pulse train is given by the fixed period Tp0 used during PWM operation. The on time of each pulse within the pulse train is the default value Ton0. Based upon the control voltage, controller 104 determines the pulse train number N_group (the group mode) and also the group period Tp_group.

Should the control voltage drop below the low threshold voltage Vth as determined in a step 515, controller begins DPFM operation in a step 520. The period for the switching frequency during DPFM operation is given by a product of Tp_group0 and a DPFM function (fdpwm) of the control voltage. The on time within each period is the default on time Ton0.

The table below lists parameters used by an embodiment of controller 105 for the PWM, group mode control, and DPFM modes of operation, where Fmax is the switching frequency for the PWM mode of operation.

| Mode | Vc | N | $T_{on}$ | $T_p$ |
|---|---|---|---|---|
| PWM | $Vc >= V_{th}' + (N_{max} + 1) * V_{step}$ | $N_{max} + 1$ | $T_{on0} * f_{pwm}(Vc)$ | $1/F_{max}$ |
| Group | $Vc < V_{th}' + (N_{max} + 1) * V_{step}$ $Vc >= (Vth' + V_{step})$ | Floor $((Vc - V_{th}')/V_{step})$ | $T_{on0}$ | $(N_{max} + 1)/F_{max} *$ $N * V_{step}/$ $(Vc - V_{th}')$ |
| DPFM | $Vc < (Vth' + V_{step})$ | 1 | $T_{on0}$ | $(N_{max} + 1)/F_{max} *$ $f_{dpfm}(Vc)$ |

Figure 6:
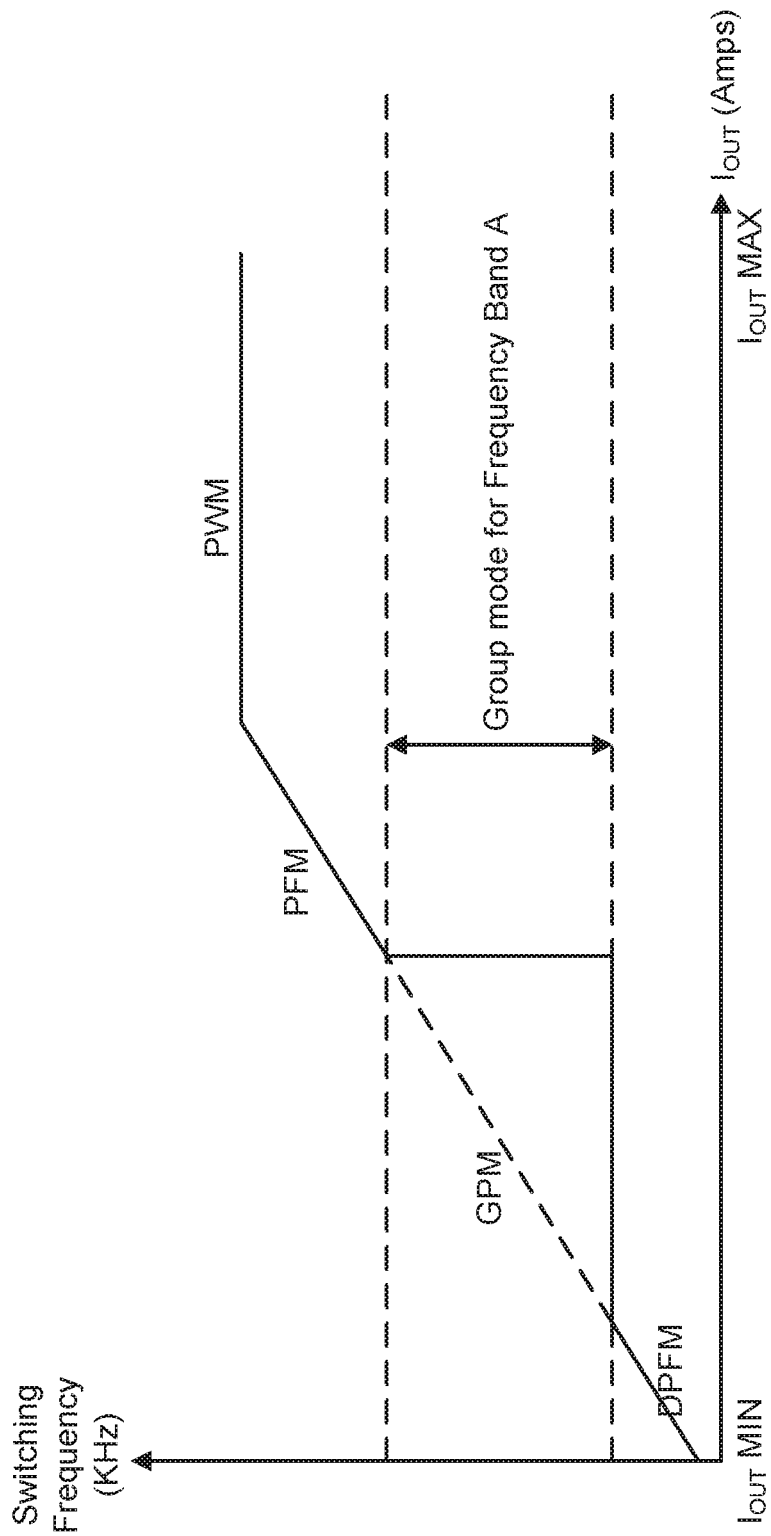
FIG. 6 illustrates switching modes as a function of the control voltage in which a group pulse mode is implemented between a pulse frequency mode of operation and a deep pulse frequency mode of operation in accordance with an aspect of the disclosure.

Rather than transition to the group mode control from a PWM mode of operation, the transition can instead be from a PFM mode of operation as shown in FIG. 6. In such an embodiment, controller 105 may operate using the following parameters:

| Mode | Vc | N | $T_{on}$ | $T_p$ |
|---|---|---|---|---|
| PWM | $F_{max} > F_{limit} * f_2(Vc)$ | $N_{max}$ | $T_{on0} * f_1(Vc)$ | $1/F_{limit}$ |
| PFM | $F_{max} < F_{limit} * f_2(Vc)$ $Vc >= V_{th}' + (N_{max} + 1)*V_{step}$ | $N_{max}$ | $T_{on0}$ | $(N_{max}+ 1)/F_{max} *$ $f_2(Vc)$ |
| Group | $Vc <= V_{th}' + (N_{max} + 1) * V_{step}$ $Vc >= (V_{th}' + vc\_step)$ | Floor $((Vc - V_{th}')/V_{step})$ | $T_{on0}$ | $(N_{max} + 1/F_{max} *$ $N * V_{step}/$ $(Vc - V_{th}')$ |
| DPFM | $Vc < (V_{th}' + vc\_step)$ | 1 | $T_{on0}$ | $N_{max}/F_{max} *$ $f_{dpfm}(Vc)$ |

Figure 7:
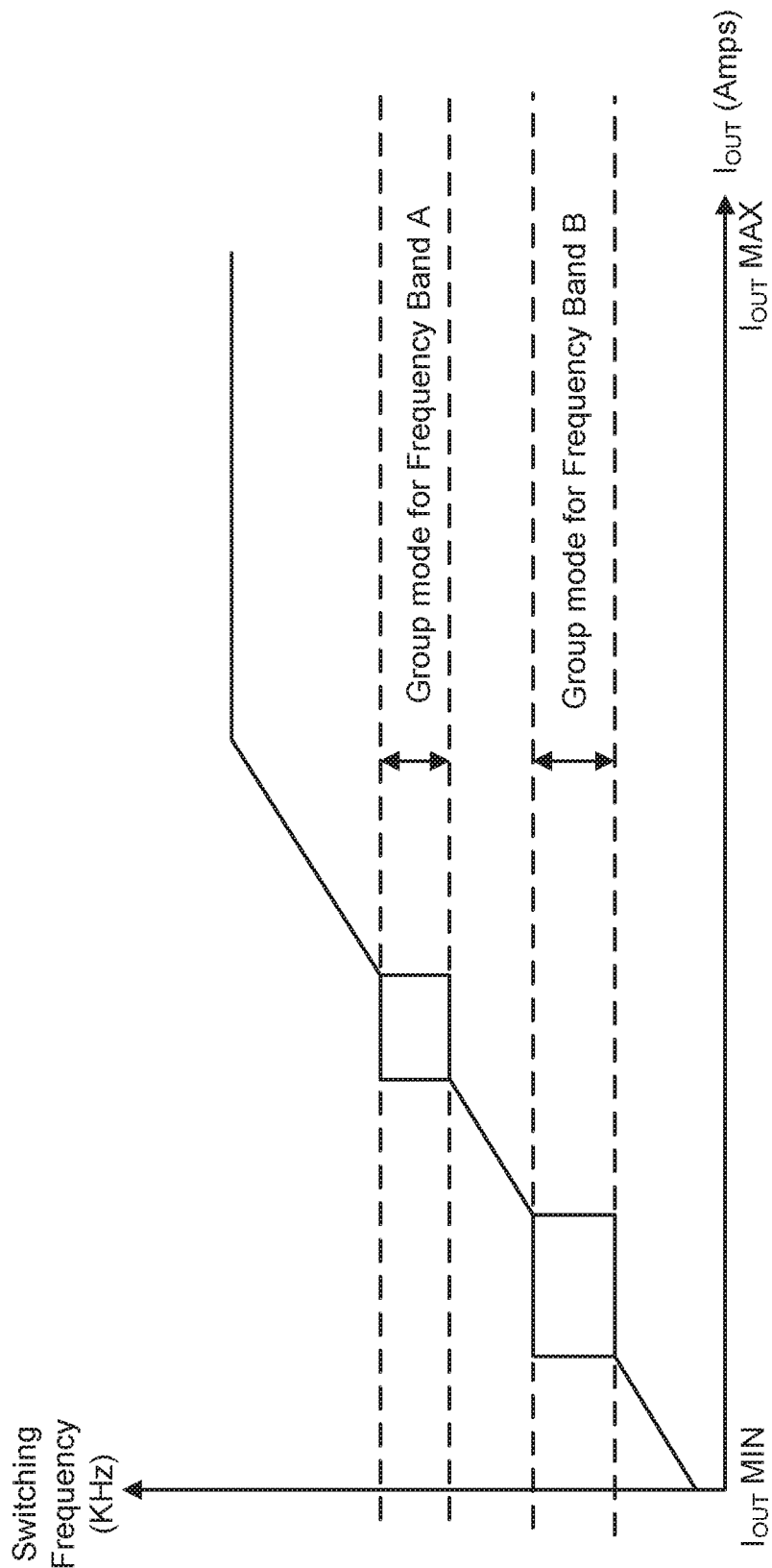
FIG. 7 illustrates switching modes as a function of the control voltage in which two group pulse modes are implemented for different bands of switching frequencies in accordance with an aspect of the disclosure.

In yet another alternative embodiment, controller 105 may be configured to implement multiple group pulse modes as shown in FIG. 7. It will be further appreciated that the GPM modes may be selected around certain frequency bands such as the frequency bands A and B of FIG. 7 to provide EMI management around those frequency bands as described herein.

Those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter controller, comprising:
   a loop filter for filtering an error signal to produce a control voltage;
   a loop control logic circuit configured to quantize a first function of a difference between the control voltage and a threshold voltage to determine an integer number of pulses for each pulse in a pulse train responsive to the control voltage being within a group mode control voltage range for a group pulse mode of operation and to determine a group period for the pulse train that is proportional to a product of a default group period and a second function of the difference, wherein the loop control logic circuit is further configured to command a power switch to cycle according to the integer number of pulses within the group period responsive to the control voltage being within the group mode control voltage range, wherein the group mode control voltage range is divided into a plurality of equal control voltage steps, and wherein the first function of the difference equals a ratio of the difference to the equal control voltage step, and wherein the loop control logic circuit is configured to quantize the first function by taking a nearest integer value of the first function.

2. The switching power converter controller of claim 1, wherein the loop control logic circuit is further configured to command the power switch to cycle according to a pulse width modulation mode of operation responsive to the control voltage being greater than an upper limit for the group mode control voltage range.

3. The switching power converter controller of claim 2, wherein each cycle of the power switch during the pulse width modulation mode of operation occurs according to a pulse width modulation (PWM) switching frequency, and wherein the loop control logic circuit is further configured to command the power switch to cycle according to the integer number of pulses at the PWM switching frequency.

4. The switching power converter controller of claim 1, wherein the loop control logic circuit is further configured to cycle the power switch according to a pulse frequency mode of operation responsive to the control voltage being greater than an upper limit of the group mode control voltage range.

5. The switching power converter controller of claim 1, wherein the loop control logic circuit is further configured to cycle the power switch according to a deep pulse frequency mode of operation responsive to the control voltage being less than a lower limit for the group mode control voltage range.

6. The switching power converter controller of claim 1, further comprising:
   a sensor configured to sense and digitize a feedback voltage to form a digital feedback voltage; and
   a comparator configured to compare the digital feedback voltage to a digital reference voltage to form the error signal.

7. The switching power converter controller of claim 1, wherein the second function equals a product of the default group period with a ratio of the integer number of pulses to the first function of the difference.

8. The switching power converter controller of claim 1, wherein the switching power converter controller is a primary-side controller for a flyback converter.

9. A method, comprising:
   processing a feedback voltage for a switching power converter to provide a control voltage; and
   responsive to the control voltage being within a group mode control voltage range:
      determining a value for a first function of a difference between the control voltage and a threshold voltage;
      quantizing the value of the first function to determine an integer number of pulses for a pulse train;
      adjusting a default group period responsive to a second function of the difference to provide an adjusted group period; and
   cycling a power switch according to the integer number of pulses within the adjusted group period, wherein the first function of the difference equals a ratio of the difference to an increment of the group mode control voltage range, and wherein quantizing the value of the first function comprises taking a nearest integer value of the value of the first function.

10. The method of claim 9, further comprising:
    cycling the power switch according to a pulse width modulation mode of operation responsive to the control voltage being greater than an upper limit of the group mode control voltage range.

11. The method of claim 10, wherein cycling the power switch according to the pulse width modulation mode of operation occurs according to a pulse width modulation (PWM) switching frequency, and cycling of the power switch according to the integer number of pulses occurs at the PWM switching frequency.

12. The method of claim 10, further comprising:
    cycling the power switch according to a pulse frequency modulation mode of operation responsive to the control voltage being greater than an upper limit of the group mode control voltage range.

13. The method of claim 9, wherein the second function equals a product of the default group period with a ratio of the integer number of pulses and the first function of the difference.

14. The method of claim 9, wherein the power switch is a power switch for a flyback converter.

15. The method of claim 14, further comprising: sensing an auxiliary winding voltage through a voltage divider to form the feedback voltage.

16. The method of claim 15, wherein processing the feedback voltage comprises comparing a digital version of the feedback voltage with a digital reference voltage to form a digital error signal and filtering the digital error signal to form the control voltage.

17. The method of claim 9, further comprising:
    cycling the power switch according to a deep pulse frequency mode of operation responsive to the control voltage being less than a lower limit for the group mode control voltage range.

* * * * *